(12) United States Patent
Giacometto et al.

(10) Patent No.: US 7,783,026 B2
(45) Date of Patent: Aug. 24, 2010

(54) SYSTEM AND METHOD FOR CONNECTING A PORT CONNECTOR TO AN INTERFACE CIRCUIT

(75) Inventors: Mario Giacometto, Selzach (CH); Stephan Nufer, Münchringen (CH)

(73) Assignee: Aastra Telecom Schweiz AG, Solothurn (CH)

( * ) Notice: Subject to any disclaimer, the term of this patent is extended or adjusted under 35 U.S.C. 154(b) by 1273 days.

(21) Appl. No.: 11/319,409

(22) Filed: Dec. 29, 2005

(65) Prior Publication Data

US 2007/0154012 A1     Jul. 5, 2007

(51) Int. Cl.
*H04M 7/00*     (2006.01)

(52) U.S. Cl. .................. 379/225; 379/93.05; 379/93.09

(58) Field of Classification Search ................. 379/225, 379/93.05, 93.09
See application file for complete search history.

(56) References Cited

U.S. PATENT DOCUMENTS 7,185,115 B2 *   2/2007   Toth et al. ................... 709/250

* cited by examiner

*Primary Examiner*—Curtis Kuntz
*Assistant Examiner*—Karen L Le
(74) *Attorney, Agent, or Firm*—McCarthy Tetrault LLP

(57) ABSTRACT

The invention provides a system and method for configuring a connection for a port in an electronic device. The system comprises: an interface circuit to process signals for the connection for the port; an interface circuit connection bus connecting to the interface circuit; a port connection bus connecting to the port; and a removable wiring adapter providing a connection circuit connecting tracks in the interface connection bus to tracks in the port connection bus.

20 Claims, 12 Drawing Sheets

| Name | Function | Comment |
|---|---|---|
| System Modules (SM) | | |
| SM-LAN8 | 8+1 port 10/100 Mbps Ethernet Switch Module | The module adapts the wiring of LAN- and AD2-interfcaces to the RJ45 connectors, if AD2 cards are used |
| SM-DSP2 | 2 DSP-chips per module | Used for DECT (ADPCM/ PCM conversion), VoIP, Voice Mail compression, Full-duplex hands free.; CLIP/SMS. Max. 4 modules can be stacked. |
| SM-DSP1 | 1 DSP chip per module | |
| SM-LINK | Serial Ascotel IntelliGate Link | Used to cascade two systems 100 |
| SM-FMEM | Serial Flash Memory Extension | For memory expansion |
| SM-IPMS | IP-Media Switch with own Ethernet Port | Transcodes RTP into PCM streams and vice versa. The module may be used where more IP-channels are needed, then those provided by the embedded media switch |
| Wiring Adapters (WA) | | |
| WA-TS0 | WA used with T/S Interface Cards (Wiring scheme type0) and Door Interface Card | Adapts the wiring from the 4-wire Interface Card (S/T, door interface) to the RJ45 Connectors. Provides port-configuration S or T |
| WA-TS1 | Wiring Adapter for the T/S Interface Cards (Wiring scheme Type 1) | Adapts the wiring from the 4-wire Interface Card S/T to the RJ45 connectors. Provides port-configuration S or T |
| WA-2W-T2 | Wiring Adapter for all 2-wire Interface Cards and the PRA Card | Adapts the wiring from the 2-wire Interface Cards to the RJ45 connectors. |

Fig. 8

| Interface Card Name | Function | Interfaces | Comment |
|---|---|---|---|
| EADP4 EAD4V EAD4C | Subscriber Interfaces AD2 | 4xAD2 | AD2 interfaces only with A150/300. Courtesy and Voicemail embedded on mainboard |
| ETAB4 | Subscriber Interfaces analogue | 4xAB | Interfaces to analogue Terminals and devices, CLIP is supported |
| ESST2 | Mixed Card S-Bus- and Basic Rate Interface (T) | 1xS and 1xS or T | 1 port fix S (not switch-able) 1 port switch-able S to T |
| EAAB2 | Analogue trunk interfaces | 2xAB | with CLI Recognition |
| ODAB | Door Interface with relays or control inputs | 1xAB internal 4xrelays or control inputs | Relay contacts or sensor inputs are individually switch-able |
| TIC-1T2 | Primary Rate Interface PRA (T2) | 1xT2 or S2 | port switch-able from T2 to S2 |
| TIC-4AB | Analogue trunk interfaces | 4xAB | Pulse and DTMF dialling, metering pulse detection, CLI Recognition |
| TIC-2AB | Analogue trunk interfaces | 2xAB | Pulse and DTMF dialling, metering pulse detection, CLI Recognition |
| TIC-2TS | Basic Access Interfaces BA switch-able from T to S | 2xT or S | both Interfaces individually switch-able from T to S |
| TIC-4TS | Basic Access Interfaces BA partly switch-able from T to S | 1xT and 3xT or S | 1 port is fix T (not switch-able) 3 ports individually switch-able from T to S |

| Interface Name | Description | Data rate | Voltages |
|---|---|---|---|
| AD2 | Digital 2 wire interface for System Terminals and DECT System Base | 160 kbit | Power supply about 36 VDC / Data: few volts |
| ab | Analogue subscribe interface | analogue | Ring signal about 65V / DC: about 40 VDC / Speech: few volts |
| ab | Analogue trunk interface | analogue | Ring signal about 65V / DC: about 40 VDC / Speech: few volts |
| S | ISDN (Basic rate access) Subscriber interface (2B+D) | 144 kbit | Phantom power 40V / Data: few volts |
| T | ISDN (Basic rate access) Trunc interface (2B+D) | 144 kbit | Phantom power 40V / Data: few volts |
| T2 | ISDN (Primary rate access) Trunc interface (30B+D) | 2048 kbit | Data: few volts |
| LAN | Ethernet interface (100 Base T) | 100 Mbit | Data: few volts |
| IO / TFE / .. | General purpose input and outputs and/or Door interface (prroprieatry interface definition) | analogue | IO max. 40V / Speech: few volts |

Fig. 11

SYSTEM AND METHOD FOR CONNECTING A PORT CONNECTOR TO AN INTERFACE CIRCUIT

FIELD OF INVENTION

The present invention relates to a system and method providing a set of wiring configurations for ports in an electronic device.

BACKGROUND OF THE INVENTION

A private branch exchange (PBX) network connects a series of heterogeneous terminals to a central processing device to process communications between connected terminals. For example, digital telephones, analog telephones, ISDN terminals, computers, VoIP devices and other devices may be connected to the processing element. The processing device may also have a connection to the public telephone network, thereby allowing communications to be processed between a connected terminal and an external device connected to the public telephone network. It will be appreciated that the connected terminals may have different connectivity requirements from each other. For example, different terminals may have different pin-outs for their connectors. It would be advantageous for a processing element to have flexible connection configurations to accommodate connection requirements of the different terminals and different telephone network interfaces.

SUMMARY OF THE INVENTION

In a first aspect, a system for configuring a connection for a port in an electronic device is provided. The system comprises: an interface circuit to process signals for the connection for the port; an interface circuit connection bus connecting to the interface circuit; a port connection bus connecting to the port; and a removable wiring adapter providing a connection circuit connecting tracks in the interface connection bus to tracks in the port connection bus.

In the system the interface circuit may be provided on a removable card.

The system may further comprise: a connector for connecting the adapter to a corresponding connector; and a signature circuit to distinguish the wiring adapter from other wiring adapters. In the system, the connection circuit and the signature circuit are provided on a PCB.

In the system, the wiring adapter may further comprise: a second connection circuit connecting a second set of tracks from the interface connection bus to a second set of tracks in the port connection bus; and a second connector for connecting the adapter to the corresponding connector.

In the system, the interface circuit may generate signals at specific voltage levels for specific functions intended for the connection for the port.

The system may further comprise: a second port having a second connection; a second port connection bus connecting to the second port; and a second removable wiring adapter providing a second connection circuit connecting tracks in the second interface connection bus to tracks in the second port connection bus.

In the system, the second wiring adapter may be provided on the PCB of the wiring adapter and the PCB may provide simultaneous connections: (i) between the interface connection bus and the port connection bus; and (ii) between the second interface connection bus and the second port connection bus.

The system may further comprise: a second interface circuit to process signals for the second port; and a second interface connection bus connecting to the second interface circuit.

The system may further comprise an identification detection circuit to detect a measurable value provided by the signature circuit. In the system, the measurable value is used to determine an identity for the wiring adapter.

The system may further comprise an error reporting module to generate an error condition if the identity for the wiring adapter is not compatible with the interface circuit.

In the system, the interface card may provide two sets of functional signals for two different terminals through the port.

In the system, the interface card may process signals for a third port.

In the system, the port may be a RJ-45 connector.

In the system, the port may provide a connection to a terminal for the device and the card may provide signals which are compatible with the terminal.

In the system, the terminal may be a digital terminal.

In the system, the terminal may be an ISDN terminal.

In a second aspect, a method for configuring a connection for a port in an electronic device is provided. The method comprises: generating a functional signal for transmission out of the port; converting the functional signal to an appropriate voltage signal in a removable interface circuit; transmitting the appropriate voltage signal through an interface bus; receiving the appropriate voltage signal from the interface bus at a wiring adapter; transmitting the appropriate voltage signal from the wiring adapter to a selected track in a port connection bus through a circuit in the wiring adapter; and transmitting the appropriate voltage signal from the selected track to the port.

In other aspects, various combinations of sets and subset of aspects described above are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 8 is a table showing exemplary system modules and wiring adapters that may be used in the connection system of FIG. 2;

FIG. 9 is a table showing exemplary interface cards that may be used in the connection system of FIG. 2;

FIG. 11 is a table showing exemplary interface types that may be used in the system of FIG. 2.

DETAILED DESCRIPTION OF AN EMBODIMENT

Figure 1A:
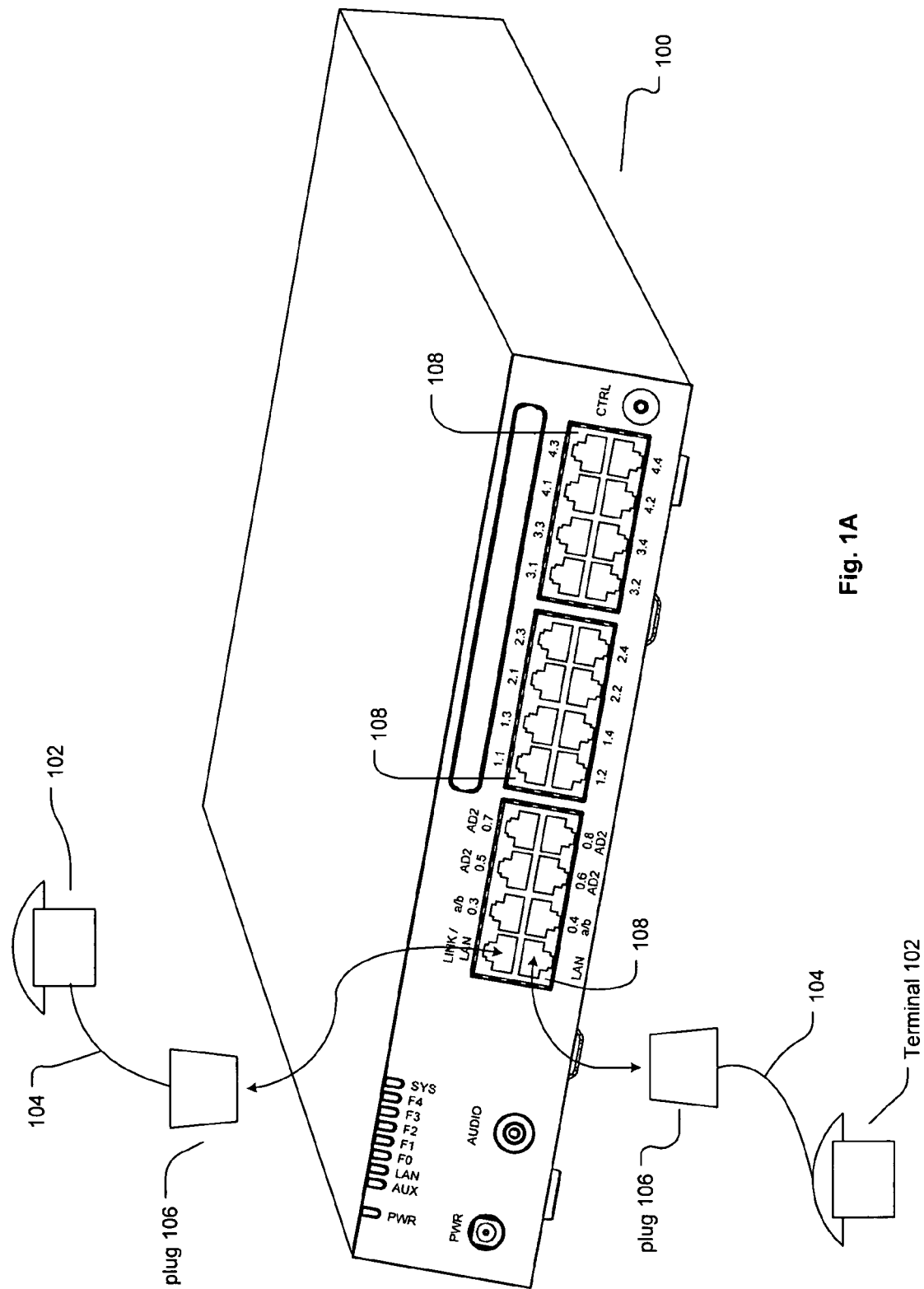
FIG. 1A is a schematic view of a communication device incorporating a signal connection system of an embodiment.

The description that follows and the embodiments described therein are provided by way of illustration of examples of particular embodiments of the principles of the present invention. These examples are provided for the purposes of explanation and not limitation of those principles and of the invention. In the description that follows, like parts are marked throughout the specification and the drawings with the same respective reference numerals.

Referring to FIG. 1A, an embodiment of the invention is incorporated into communication device 100. In this case, device 100 is a PBX hub, providing a central connection point for a plurality of terminals 102, such as analog handset, digital handsets, VoIP handsets and terminals, computer terminals, data servers and other devices. Each terminal is connected through a wireline connection cable 104 to device 100. Each connection cable 104 has a plug 106 at its end, where the individual wires in cable 104 are connected to predetermined pins in its plug 106. Plug 106 has a physical shape which is designed to mate with a connection port 108 in device 100. When a plug 104 is inserted into a port 108, individual pins in port 108 connect with a corresponding pins in plug 104. Generally, device 100 uses one type of port 108 to connect with its associated terminal devices. For example, an embodiment uses a commonly available 8-pin RJ45 connection port for port 108. However, each port 108 may have a specific wiring configuration for its pins, based on a wiring configuration of the terminal which is designed to mate with that port. It will be appreciated that other sizes and configurations of ports 108 can be used, and combinations of different types of ports may also be used.

Figure 1B:
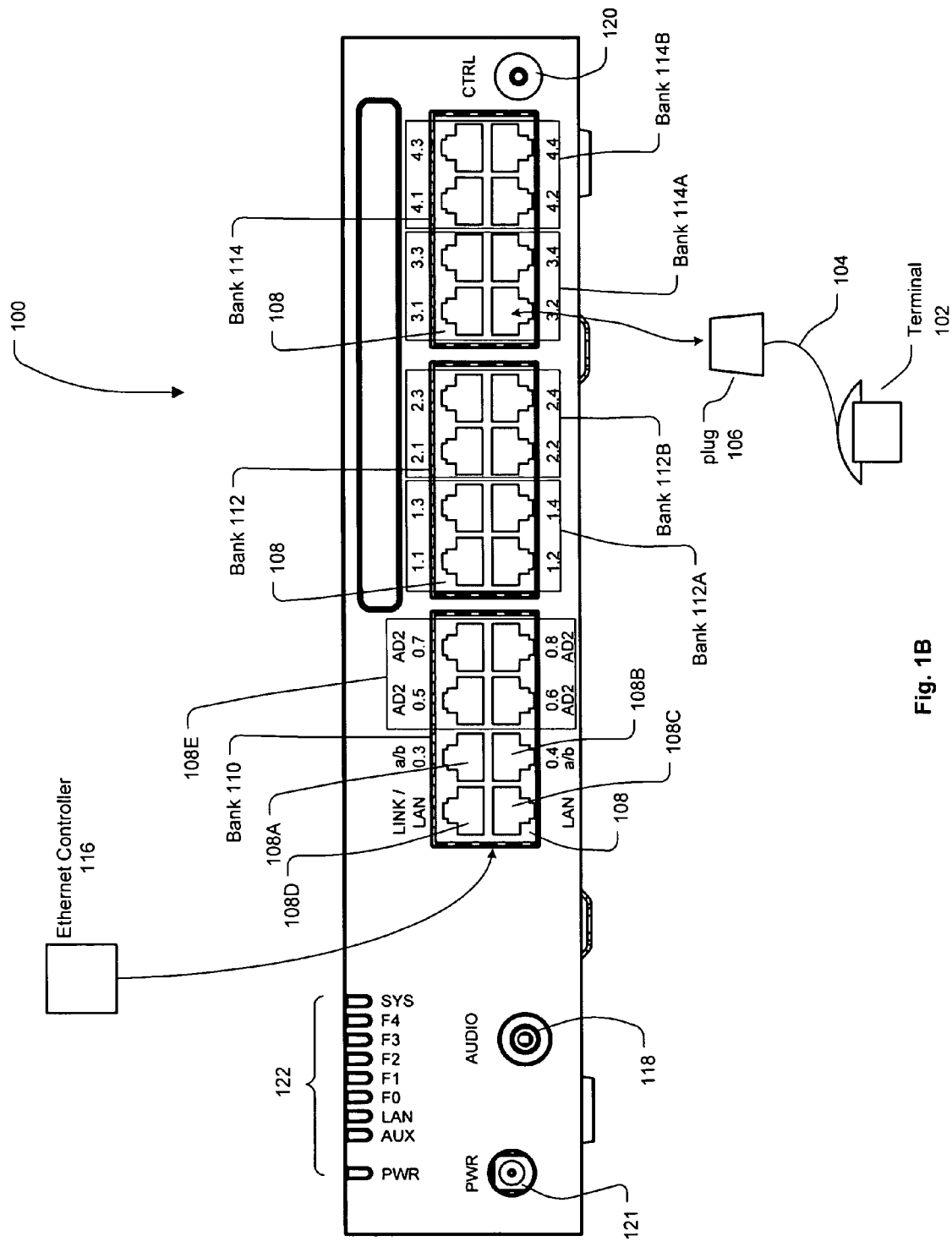
FIG. 1B is an end view of the communication device of FIG. 1A its showing external ports being connected to exemplary terminals.

Referring to FIG. 1B, one side of device 100 presents a series of ports 108 to the external world. For a particular configuration of device 100, ports 108 are grouped into three banks 110, 112 and 114. In each bank, eight RJ45 connection ports are provided. Banks 112 and 114 are used for connections to telephonic terminals or trunk connections to the telephony network and are subdivided into two sub-banks, noted as sub-banks A and B, respectively. Ports 108 in bank 110 provide different functions: ports 108A and 108B are used as analog extension ports, port 108C provides a connection to another device 100, and ports 108D provide connections to an Ethernet LAN or to the Internet. An Ethernet switch/controller 116 may be connected to ports 108D to enable Ethernet communications. Ports 108E provide AD2 connections. In other embodiments, other port configurations can be provided within and among the provided banks.

An audio line connection 118 is also provided. Device 100 further includes a control button 120, LED indicators 122 and a DC power connector 121.

Figure 2:
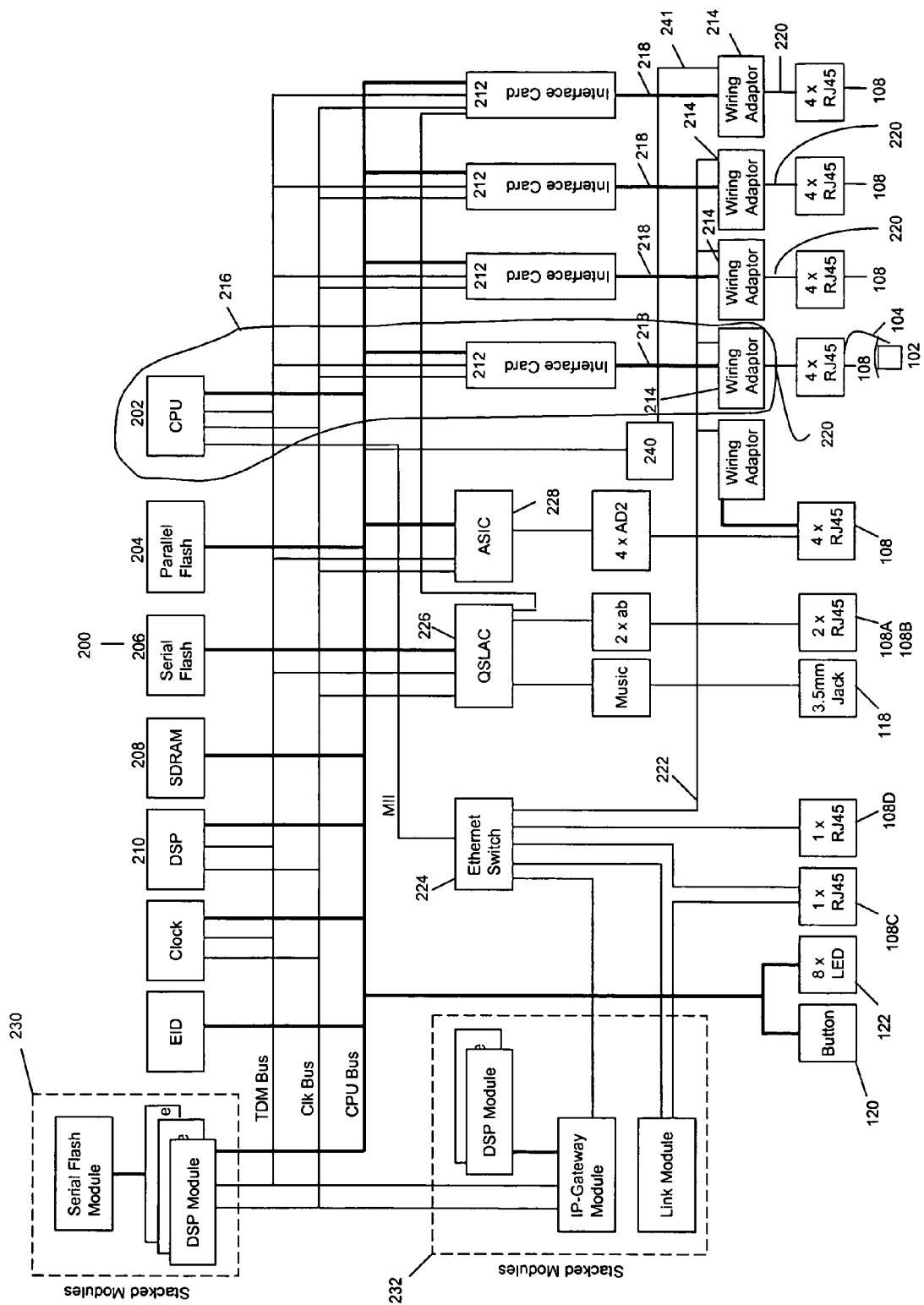
FIG. 2 is a block diagram of a signal connection system in the communication device of FIG. 1A.

Referring to FIG. 2, circuit 200 is shown, illustrating internal components of device 100. The main components of device 100 include microprocessor controller 202, parallel flash memory 204, serial flash memory 206, SDRAM 208, and DSP 210. A bus connects all components allowing each component to communicate with others. DSP 210 is used to assist with data switching, voice compression and buffering for applications such as voicemail, DECT (Digital European Cordless Telecommunications) and VoIP.

As noted, device 100 processes communications between terminals 102 connected to it. Terminals 102 connect to device 100 through ports 108. Different terminals 102 may have different pin-outs on their respective plugs 106. The embodiment allows specific pin-out for a particular port 108 to be changed to match its intended functionality. For example, if a port 108 is mean to be used for ISDN devices, then its pin-outs should be configured to generate and receive signals which are compatible with ISDN terminals. Alternatively, if that same port 108 is instead meant to be used for analog telephones, then its pin-outs must be configured to generate and receive those signals compatible with analog terminals.

The functions of each port is determined by elements in a connection circuit 216 which provides a connection configuration for a port 108. Connection circuit 216 comprises three main components: microprocessor 202, an interchangeable interface card 212, an interchangeable wiring adapter 214, an interface bus connection 218 between interface card 212 and wiring adapter 214 and a port bus connection 220 between wiring adapter 214 and port 108. As an alternative to wiring adapter 214, a system module 214A may be used (not shown). Generally, a wiring adapter 214 provides wiring connections between the interface bus and port bus, while a system module 214A provides wiring connections plus some functional signal processing. It will be appreciated that there may be hybrids between a wiring adapter 214 and a system module 214A which provides some wiring connections and basic signal processing. In any event, the terms wiring adapter 214 and system module 214A are not meant to be limiting to their functions in how either element provides wiring connections or processes signals. For the purposes of this specification, the term "wiring adapter" is used to include wiring adapters, system modules and hybrids between wiring adapters and system modules, unless otherwise noted. In the embodiment, there are four connection circuits 216, each operating in parallel to each other. Preferably a single microprocessor 202 is used by all connection circuits 216.

While microprocessor 202 controls the overall operation of device 100, at the port level, interface card 212 receives all signals received from terminal 102 and forwards or generates all signals being sent to terminal 102. Signals received by card 212 may be forwarded to microprocessor 202 for further processing. Signals generated by microprocessor 212 may be forwarded to card 212 for further processing and forwarding to terminal 102. The voltage levels of signals received and sent by card 212 are preferably controlled by circuits on card 212. When a particular interface card 212 is inserted into the connection circuit 216, a particular signature circuit or value stored in memory can be accessed by the software on CPU 202, which allows the software to identify the interface card 212 and provide any special signal processing routines or make internal mappings for signals processed between the interface card 212 and the CPU 202. Various hardware and software techniques are known in the art to provide such an identification system.

It will be appreciated that an ISDN terminal 102 may have different functional and voltage-level signals provided to pin-outs on its plug 106 as compared with the signals for an analog terminal, even though the same physical plug 106 is used. For a port 108 meant to be used for ISDN devices, its connection circuit 216 includes an ISDN interface card 212 and a wiring adapter card 214 compatible with the ISDN interface card 212. Different interface cards 212 can be provided including an analog telephone interface card, a digital telephone interface card, a LAN interface card, and others.

The pin-outs required for a particular interface card at port 108 may be different from other interface cards. In the embodiment, interface cards are provided for an analog subscriber interface, an analog trunk interface, an ISDN subscriber interface, an ISDN trunk interface, a high-capacity ISDN trunk interface, a LAN interface, AD2 connections for digital system terminals, DECT base stations, special control relays and other functions. A list of functions provided by exemplary interface cards 212 is provided in chart 900 in FIG. 9. Referring to FIG. 11, table 1100 illustrates some power and signalling requirements of different interfaces provided by different interface cards 212. In other embodiments, terminal interfaces can be provided. In other embodiments, other interfaces can be provided, such as telephony network interfaces. Exemplary telephony interfaces includes analog trunk, ISDN BRA and PRA.

Figure 10:
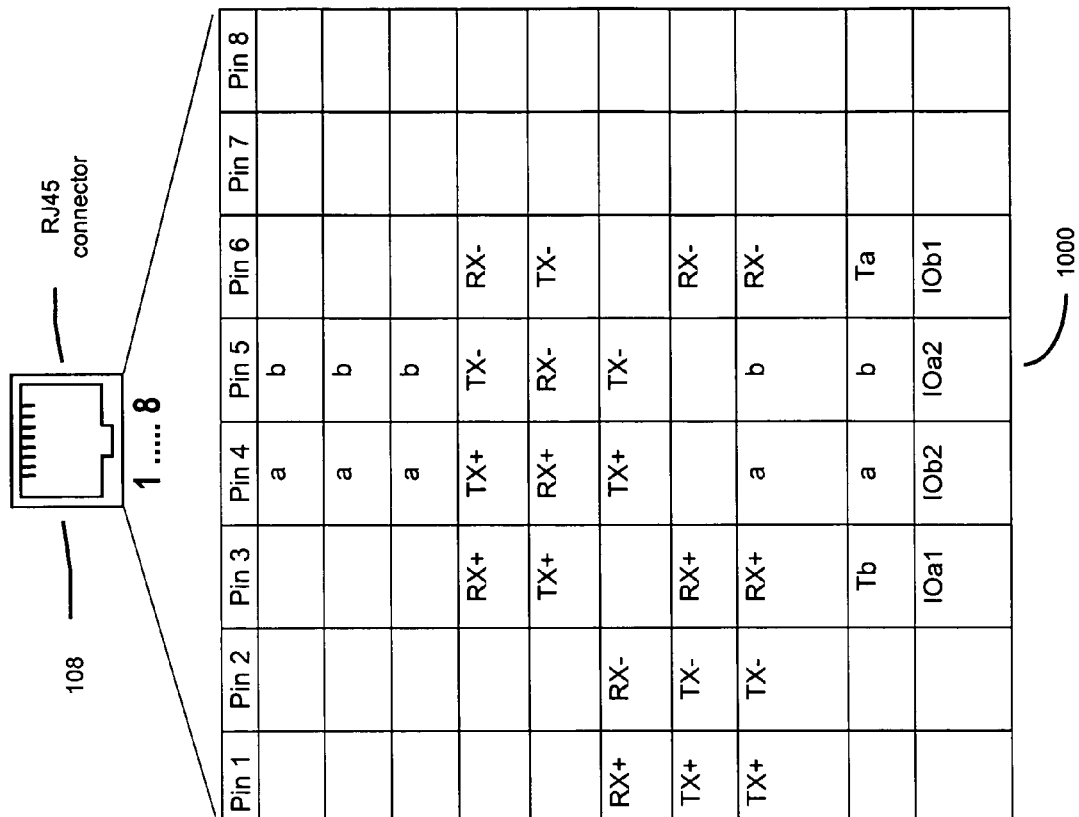
FIG. 10 is table showing exemplary pin connections for a port connector in the system of FIG. 2.

Turning now to connections within circuit 216, interface bus connection 218 provides a matrix of circuit tracks from interface card 212 to wiring adapter 214. Port bus connection 220 provides another matrix of circuit tracks from wiring adapter 214 to port 108. When a particular wiring adapter 214 is inserted in place in circuit 216, a subset of circuit tracks in interface bus connection 218 are electrically connected to a subset of circuit tracks in port bus connection 220 through circuits in wiring adapter 214. Circuits in adapter 214 may simply be tracks connecting individual tracks between connections 218 and 220. Alternatively, the circuits may process the signals contained therein through any combination of analog and/or digital devices. As such, different wiring adapters 214 can provide different sets and types of connections between the first and second connection busses 218 and 220. Referring to FIG. 10, table 1000 lists some specific pin-out arrangements for different interfaces provided by device 100. Some circuit tracks from the port bus connection 220 may connect only to circuits on wiring adapter 214 and some circuit tracks from the interface bus connection 218 may connect only to circuits on wiring adapter 214.

Further, an embodiment provides distinctive signature circuits for wiring adapter cards 214. Different signature circuits are provided with different electrical properties in order to distinguish between different cards 214. The signature circuits can be evaluated to identify the wiring adapter card 214. In an embodiment, two tracks 241 are provided from wiring adapter card 214 to wiring adapter identification detection circuit 240. Each track 241 can be connected to one of four different measurable signal values (0, 3.3, 5.0 volts or an open circuit) through card 214. As such the two tracks 241 with their four alternative signal values provide a total of 16 different value permutations. Other measurable values (e.g. −10V, +10V), types of measurable values (e.g. resistances) and numbers of values (e.g. ten values) may be generated on or through card 214. To identify a wiring adapter card 214, wiring adapter identification detection circuit 240 detects the signal values of each track 241. These values are compared by the software operating on CPU 202 against expected signal values for different wiring adapters 214 to identify a specific wiring adapter 214.

In another embodiment, circuit tracks from interface bus connection 218 may connect tracks 241 to interface card 212. A loop-back circuit may be connected to tracks 241 and may define an open circuit for one type of wiring adapter 214 and a closed circuit for another wiring adapter 214. When a particular wiring adapter 214 is inserted into connection circuit 216, the interface card 212 may analyze the connection properties of the loop-back circuit to determine what adapter card 214 has been installed. In other embodiments, signature circuits may be connected to port bus connectors 220 for analysis by devices connected to port 108.

Figure 3:
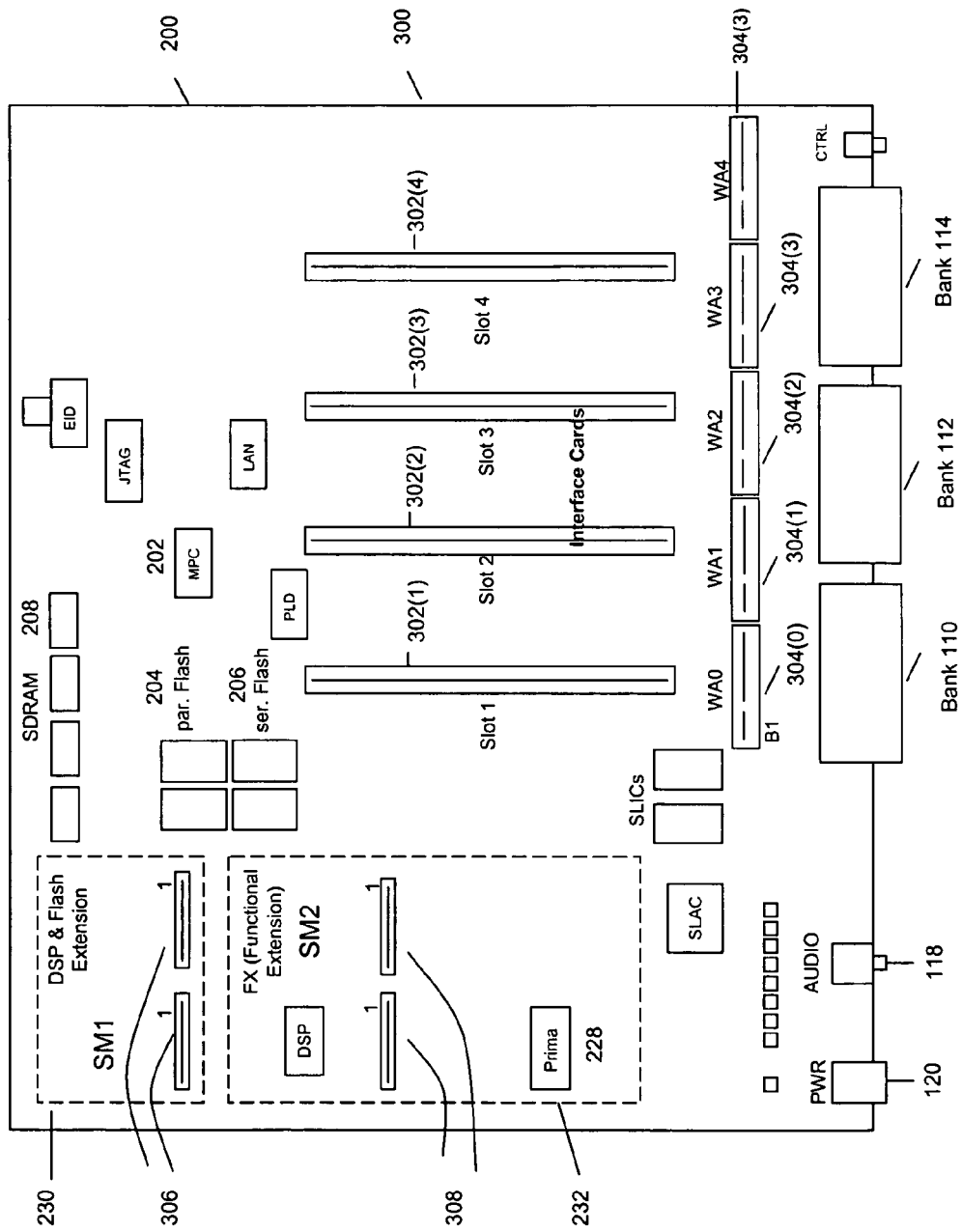
FIG. 3 is a schematic block diagram of a connection module used in the connection system of FIG. 2.

Referring to FIG. 3, further detail is provided on the physical components of device 100 and circuit 200. Elements of circuit 200 are provided on mainboard 300, which for example, is a printed circuit board (PCB). Mainboard 300 provides a substrate for mounting components directly thereon and provides circuit tracks connecting pins of components etched in its various layers.

In particular, for each connection circuit 216, connector 302 is provided to allow different interface cards 212 to be inserted into that circuit. In an embodiment, connector 302 is a SIMM memory module-type connector. As such, an interface card 212 preferably has an edge connector which mates with connector 302. Also, a wiring adapter slot 304 is provided between first and port bus connections 218 and 220. Slot 304 is shaped to receive a wiring adapter 214. When wiring adapter 214 is inserted into its slot 304, the track connections between first and port bus connections 218 and 220 are established through tracks on wiring adapter 214. It will be appreciated that for both interface cards 212 and wiring adapters 214, a variety of known connector systems may be used to allow either the interface cards 212 or adapters 214 to be inserted and removed from connection circuit 216. Generally, for a connector system, the interface card 212 or wiring adapter 214 will have a first connector which mates with a corresponding second connector in the connection circuit. Exemplary connector systems include: edge connections on a PCB mating with connectors, slots mating with connectors on a PCB, jumpers mating with pins, ribbon cables mating with pins, plugs mating with ports, cables mating with pin strips and combinations of these elements. In such systems, the connectors can be exchanged between the wiring adapter 214 (or interface card 212) and the corresponding connector in circuit 216.

Further detail is provided on port banks 110, 112 and 114 and their sub-banks. In the embodiment, a sub-bank comprises four ports in a port bank. A sub-bank is associated with and connected to a specific interface card connector 302 and a specific wiring adapter slot 304. Ports in sub-bank 112A are connected to connector 302(1) and slot 304(1); ports 108 in sub-bank 112B are connected to connector 302(2) and slot 304(2); ports 108 in sub-bank 114A are connected to connector 302(3) and slot 304(3); ports 108 in sub-bank 114B are connected to connector 302(4) and slot 304(4). These sub-bank of ports can be configured for different functionalities based on the interface card inserted into its associated connector 302 and module 214A inserted into its associated slot 304. Meanwhile, ports 108 in bank 110 can be controlled by system module 214A inserted into slot 304(0). Further detail is provided on module 214A below.

Board 300 also provides stacked modules 306 and 308 providing expansion capabilities for device 100, as explained below. Other components, such as microprocessor 202, memories 204, 206 and 208 are either mounted onto board 300 or attached thereto via other slots, and data buses for connecting different elements, and are known to a person of skill in this art and are described with minimal details. A person skilled in the art, having regard to this specification, will be able to implement the systems and methods described herein using well known circuit design, computing and communications elements and techniques.

Figure 4:
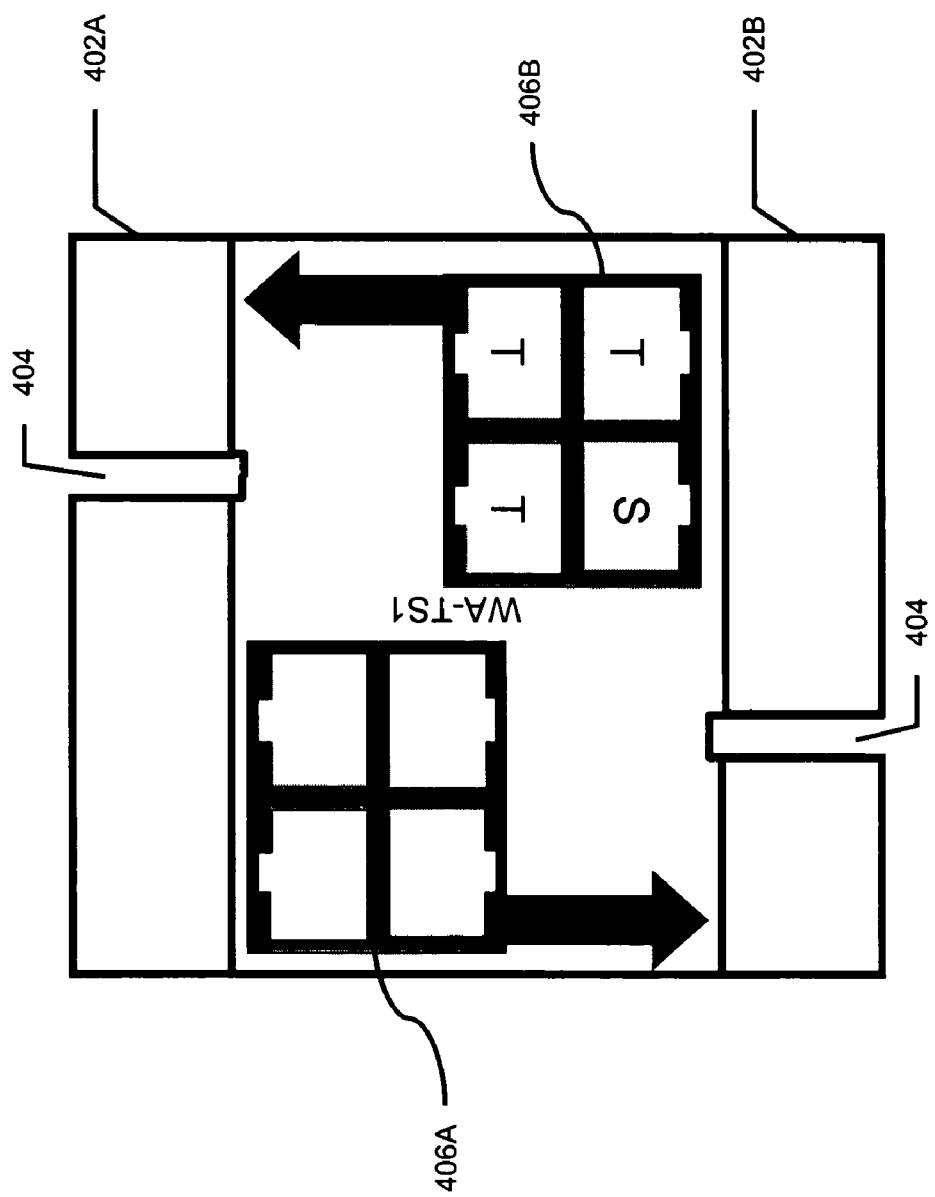
FIG. 4 is a diagram of an exemplary wiring adapter for connection to the connection system of FIG. 2.
Figure 5:
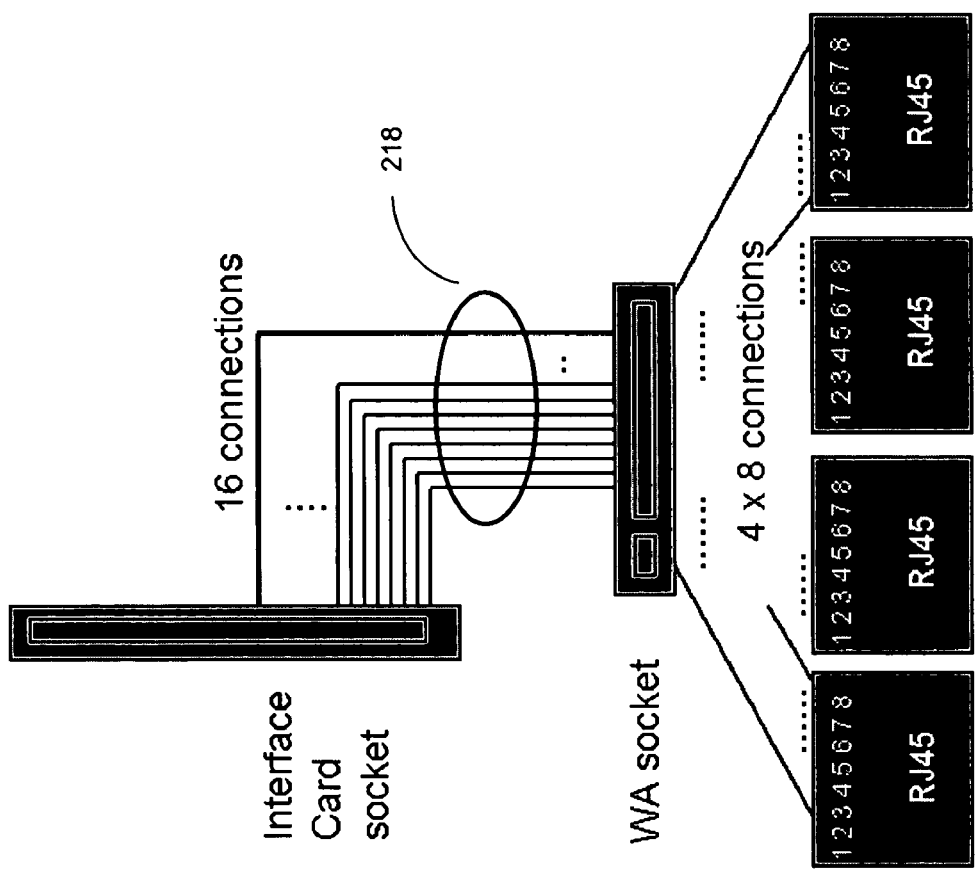
FIG. 5 is a block diagram of exemplary connections provided by the connection system of FIG. 2 for the wiring adapter of FIG. 4.

Referring to FIGS. 4, 5 and 10, further detail on an exemplary wiring adapter 214 and its associated slot 304 are provided.

In particular, referring to FIG. 4, wiring adapter 214 is shaped to mate with wiring slot 304. In an embodiment, slot 304 preferably has an alignment key to ensure that a connector 402 of wiring adapter 214 can only be inserted in one positive manner into slot 304 (FIG. 3). The alignment feature may be an off-center ridge along the slot 304. In the embodiment, wiring adapter 214 is a shaped PCB, having two sets of edge connectors 402 for insertion into slot 304. Its alignment notch 404 aligns with the ridge in slot 304. Each edge connector is a connection interface between adapter 214 and circuit 216. Other connection interfaces may be used, including separate pins, ribbon connectors and other connection technologies known in the art. When adapter 214 is properly inserted into slot 304, certain electrical tracks on edge connector 402 contact certain tracks in interface bus connector 218 and other electrical tracks on edge connector 402 contact certain tracks in port bus connector 218. As described above, each of the tracks in adapter 214 lead to certain circuits therein. It will be appreciated that with different wiring adapters, the connection between different interface cards and an RJ45 connection group of device 100 may be managed individually, so that different information may be communicated through device 100. As each RJ45 port 108 has eight pins therein, eight separate circuit tracks can be provided between each port to the insertion point of the wiring adapter. Some repetition of signals from interface card 212 to each port 108 may be provided.

Wiring adapter 214 is shown as having two (interface) connectors 402A and 402B. As such, two separate circuits may be provided on adapter 214. Each circuit may have different functionalities and different signature circuits. When connector 402a is inserted into slot 304, one circuit is connected to connection circuit 216; when connector 402b is inserted into slot 304, another circuit is connected to connection circuit 216. In an alternative embodiment, the circuits may provide an identical wiring and circuit adapter signature information, so as to provide a redundant set of circuits. It will be appreciated that, subject to physical space limitations, wiring adapter 214 may have still more pin connections and adapter circuits thereon for connection to board 200 in other embodiments.

For an interface card 212 providing mixed subscriber and trunk connections, an exemplary adapter 214 provides circuitry to configure a port 108 to be either a trunk (T) connection or a subscriber (S) connection. If a port is configured to be a trunk connection, it is intended to be used as a high capacity data link to another device, such as another device 100. If a port is configured to be a subscriber connection, it is intended to be used as a link to terminal 102. As shown by the silk screening 406A and 406B, exemplary adapter 214 provides two configurations of trunk and subscriber connections for its associated bank of ports. One configuration provides two subscriber ports and two terminal ports. The other configuration provides one subscriber port and three terminal ports. Other wiring adapters 214 may provide other configurations of S and T ports, including: four T ports in the bank; three S ports plus one T port; and one S port plus three T ports.

As noted earlier, a signature circuit (described earlier) can be provided for each separate circuit provided by a wiring adapter 214. The signature circuit can be used to identify and differentiate among the different port configurations provided by the different wiring adapters 214. As such, when a wiring adapter 214 is inserted into slot 304, interface card 302 or CPU 202 can analyze the signature circuit and identify whether the installed wiring adapter 214 is compatible with it. If it is not compatible, interface card 302 or CPU 202 may generate an error condition for further use by device 100. For example, an alarm signal may be generated for a terminal connected to device 100; alternatively, a signal may be flashed using LED 122. Further, if adapter 214 is compatible with the interface card, its particular port configuration may be detected and interface card 302 may then provide special features for particular ports, e.g. provide access settings for each subscriber and trunk port. Some actual pin-outs that a port 108 can follow are shown in table 1000 in FIG. 10.

Turning now to FIG. 5, interface bus connections 218 between an interface card connector 302 and a wiring adapter slot 304 are shown. Also shown are port bus connections 220 between slot 304 and ports 108 in a given bank of ports, for example, bank 112A. Interface bus connections 218 comprise a bus of 16 individual wires that are provided through tracks in mainboard 300. Port bus connections 220 are also provided through tracks in mainboard 300. It will be appreciated that in other embodiments, other connections may be made directly between interface connector 302 directly to ports 108.

Figure 6:
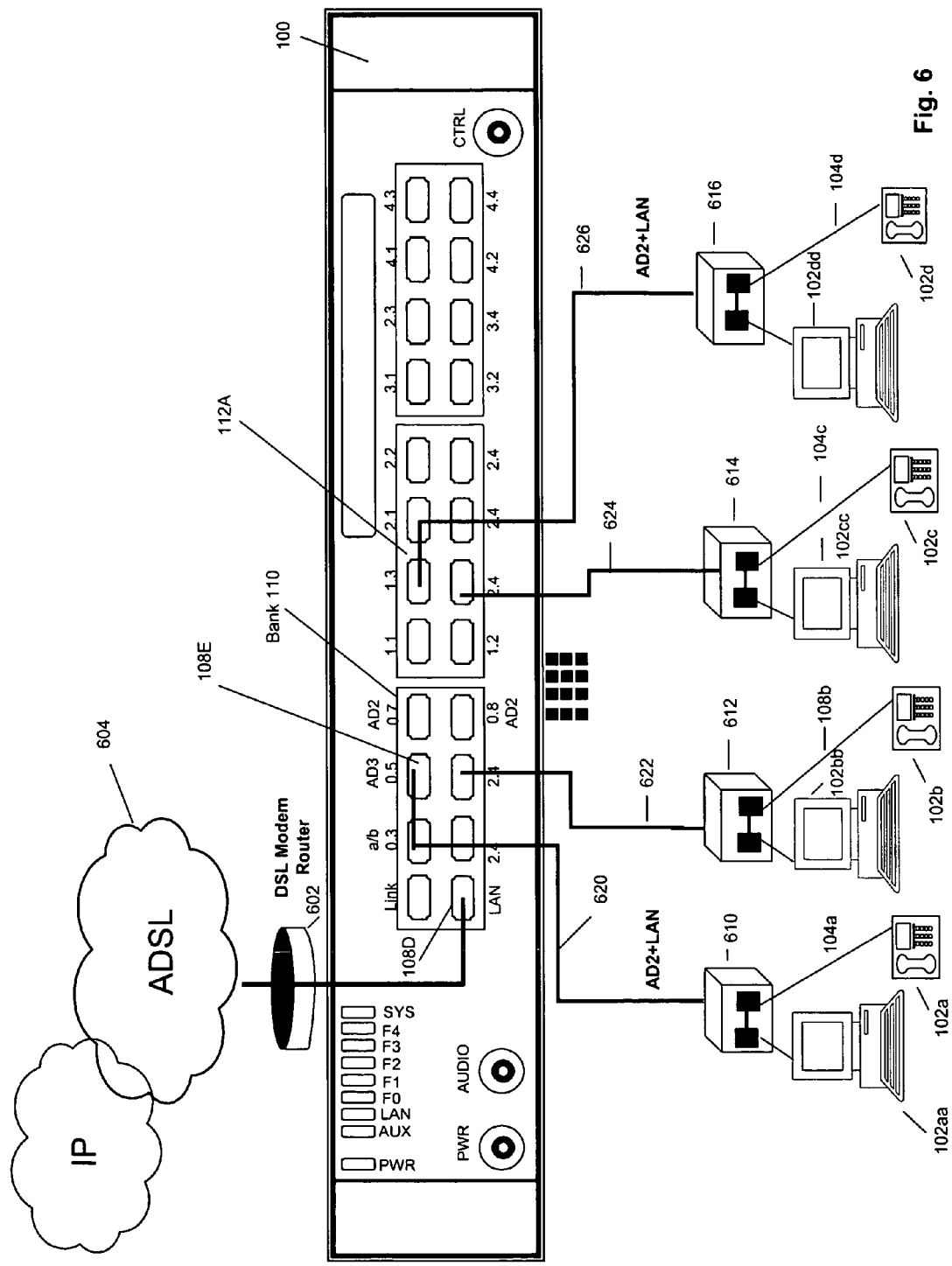
FIG. 6 is a schematic diagram view of the communication device of FIG. 1 being connected to external terminals and an external communication network through a LAN interface module in the device.

Referring to FIG. 6, further detail is provided on bank 110 for device 100. In an embodiment, device 100 has dedicated LAN ports in for example bank 110. Generally, connections for LANs require only four lines. As noted, ports 108 have eight pins. As such, for a particular LAN port 108, four pins can be used for a LAN connection and the other four pins can be used for other devices. A single plug connected to a LAN port 108 can carry signals for a LAN connection (per pin-outs in Table 1000, FIG. 10) and additional device(s) to a location, where the signals can then be split into there constituent groups and fed individually to the correct devices. For example, two pins can be used for an AD2 system terminal connection or for ADSL data signals. In other embodiments, other wiring interfaces may be provided for different data types and speeds, including analog subscribe or trunk interfaces, ISDN subscriber or trunk interfaces, 10/100 base T-Ethernet or other LAN interfaces, security door/intrusion signal interfaces, or other input/output data interfaces or combinations of interfaces.

Device 100 is connected via LAN port 108D to a DSL modem/router 602, which in turn is connected to an ADSL/IP network 604. A system module 214A (FIG. 7) provides AD2 connectivity through ports 108E and sub-bank 112A, so that through a single cable 104 both voice and IP data may be carried. For example, 104a, 104b, 104c, and 104d are each connected from a port of device 100 to AD2 connectors 610, 612, 614 and 616 respectively. Each of AD2 connectors 610, 612, 614 and 616 provides a first connection to an office telephone, and a second connection to a computer workstation in the office. For instance, as shown, AD2 connector 610 as shown provides a voice connection to office telephone 102A and a data connection to computer 102AA; connector 612 provides a voice connection to office telephone 102B and a data connection to computer 102BB; connector 614 provides a voice connection to office telephone 102C and a data connection to computer 102CC; and connector 616 provides a voice connection to office telephone 102D and a data connection to computer 102DD. It will be appreciated that as other or additional wiring adapters/interface cards are inserted into device 100, other devices providing different communication of information may be connected to device 100.

Figure 7:
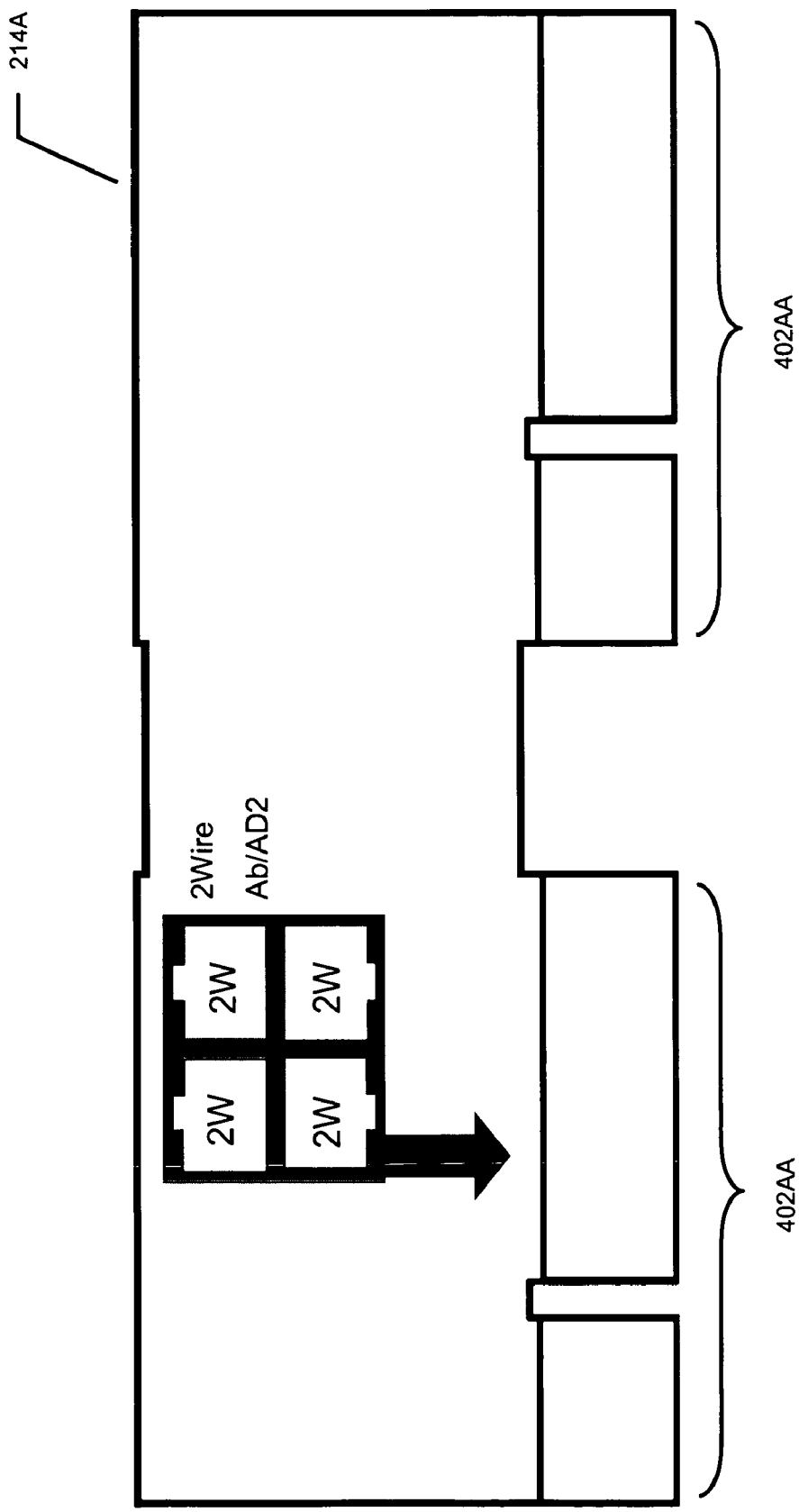
FIG. 7 is a diagram of a wiring adapter containing LAN interface functionality as shown in FIG. 6.

Referring to FIG. 7, system module 214A provides the combined LAN and AD2 connections for its associated ports 108. As noted earlier, each wiring slot 304 is associated with its corresponding connector 302. Using module 214A, device 100 can be configured such that for example ports 108E and ports in sub-bank 112A provide a combination of LAN and AD2. Module 214A has components and circuitry thereon to process, control and generate signals to handle LAN interfaces, as well it provides the necessary wiring capabilities to handle AD2 interfaces. Physically, module 214A has two connectors 402AA on a same side of its PCB. Connectors 402AA are spaced such that they will simultaneously mate with slots 304(0) and 304(1). In other embodiments, module 214A may connect with only one connector 302 or may connect with other connectors 302.

Referring to FIGS. 2, 3, 6 and 7, module 214A also provides a LAN switch to provide connections between 8+1 Ethernet port connections in device 100. In this embodiment a ninth Ethernet port (i.e., the +1 port) provided on module 214A is connected via connections 222 to Ethernet switch 224 to enable communication from LAN port 108D through module 214A to other ports connected to module 214A. Such other ports comprise ports 108E and ports in sub-bank 112A. Also for the embodiment, module 214A provides AD2 and LAN connections via the RJ45 connections of sub bank 110B and sub-bank 112A. When an AD2 interface card 212A is inserted on sub bank 112A, LAN and AD2 interfaces are both provided on their ports 108. When interface card 212 is not inserted, LAN connections are provided only through ports 108 of sub bank 112A. It will be appreciated that for other embodiments, a system module may have additional personalities made available through another set of pin connections, in a similar manner as module 214A described above.

Referring to FIG. 8, chart 800 shows other wiring adapters and system modules. System modules, which may occupy two or more slots 304 are listed in portion 802 and wiring adapter cards 214 are listed in portion 804.

Referring to FIG. 10, chart 1000 shows exemplary pin-outs for RJ45 connectors in device 100 for different applications.

Turning now to additional features of device 100 as shown in FIG. 3 a quad subscriber line audio (QSLAC) processing circuit 226 provides legacy communication support and connects to an audio jack 118 and two port connectors 108A and 108B. QSLAC circuit 226 may also receive and process additional information, such as for example security/door intrusion information, via interface card socket 212, 302(4). As part of this embodiment of device 100, four AD2 ports 108E are provided in device 100 through ASIC circuit 228, which provides functional components for the interface circuit for the 2-wire AD2 digital terminal interface.

In the embodiment, Ethernet switch/controller 224 is provided through an Ethernet controller, such as controller RTL8309SB from Realtek Semiconductor Corp. The ninth (or "+1") port of Ethernet switch 224 is a media independent interface (MII) and is connected to the CPU. The Ethernet controller connects all internal Ethernet interfaces of the embodiment including all inserted system modules 230, 232 and wiring adapters 214 together. It will be appreciated that other network interface card controllers may be used in other embodiments.

A DSP extension bus is also provided through stacked module 230. Stacked module 230 provides DSP extension capabilities to device 100. For the embodiment, four DSP modules, or three DSP modules and a serial flash module, may be stacked onto stack module 230 through connector slots 306, thereby providing additional signal processing capabilities for device 100. Another functional extension bus can also be provided through stacked module 232. Chips and chipsets with additional functional capabilities inserted onto stack module 232 at connector slots 308 to expand the capabilities of device 100. For an embodiment, the system module SM-LINK can be inserted into socket 232 to provide connectivity to a second device 100. In addition to this, the system module SM-IPMS can be inserted (stacked) to expand the voice over IP capacity of the embodiment.

It will be appreciated from the above examples that a myriad of components may be used to implement embodiments of the invention.

Although the invention has been described with reference to certain specific embodiments, various modifications thereof will be apparent to those skilled in the art without departing from the spirit and scope of the invention as outlined in the claims appended hereto.

We claim:

1. A system for configuring a connection for a port in an electronic device, comprising:
    a removable interface circuit on a first printed circuit board (PCB) to process signals for said connection for said port;
    an interface circuit connection bus connecting to said interface circuit;
    a port connection bus connecting to said port; and
    a removable first wiring adapter interface for said interface circuit, providing a connection circuit connecting tracks in said interface connection bus to tracks in said port connection bus, said first wiring adapter comprising
        a second PCB;
        a connector located on said second PCB for connecting said adapter to a corresponding connector in said system;
        a set of connections to connect said port to a first set of tracks from said interface connection circuit to a first set of tracks in said port connection bus; and
        a signature circuit located on said second PCB to distinguish said wiring adapter from a second wiring adapter,
    wherein
    said port provides a physical connection for said electronic device to a network connection or a terminal; and
    said signature circuit is used to identify said first wiring adapter from said second wiring adapter for said interface circuit.

2. The system for configuring a port in an electronic device as claimed in claim 1, wherein said wiring adapter further comprises:
    a second connection circuit connecting a second set of tracks from said interface connection bus to a second set of tracks in said port connection bus; and
    a second connector for connecting said adapter to said corresponding connector.

3. The system for configuring a port in an electronic device as claimed in claim 2, wherein said interface circuit generates signals at specific voltage levels for specific functions intended for said connection for said port.

4. The system for configuring a port in an electronic device as claimed in claim 1, further comprising:
    a second port having a second connection;
    a second port connection bus connecting to said second port; and
    a second removable wiring adapter providing a second connection circuit connecting tracks in said second interface connection bus to tracks in said second port connection bus.

5. The system for configuring a port in an electronic device as claimed in claim 4, wherein:
    said second wiring adapter is provided on said second PCB; and
    said second PCB provides simultaneous connections: (i) between said interface connection bus and said port connection bus; and (ii) between said second interface connection bus and said second port connection bus.

6. The system for configuring a port in an electronic device as claimed in claim 4, further comprising:
a second interface circuit to process signals for said second port; and
a second interface connection bus connecting to said second interface circuit.

7. The system for configuring a port in an electronic device as claimed in claim 1, further comprising:
an identification detection circuit to detect a measurable value provided by said signature circuit,
wherein said system utilizes said measurable value to determine an identity for said wiring adapter.

8. The system for configuring a port in an electronic device as claimed in claim 7, further comprising:
an error reporting module to generate an error condition if said identity for said wiring adapter is not compatible with said interface circuit.

9. The system for configuring a port in an electronic device as claimed in claim 1, wherein said interface card provides two sets of functional signals for two different terminals through said port.

10. The system for configuring a port in an electronic device as claimed in claim 1, further comprising:
a third port,
wherein said interface card processes signals for said third port.

11. The system for configuring a port in an electronic device as claimed in claim 10, wherein said port is a RJ-45 connector.

12. The system for configuring a port in an electronic device as claimed in claim 11, wherein said port provides a connection to a terminal for said device and said interface card provides signals which are compatible with said terminal.

13. The system for configuring a port in an electronic device as claimed in claim 12, wherein said terminal is a digital terminal.

14. The system for configuring a port in an electronic device as claimed in claim 12, wherein said terminal is an ISDN terminal.

15. A method for configuring a connection for a port in an electronic device, comprising:
using a signature circuit on a wiring adapter on a first printed circuit board (PCB) to determine connections to said port;
generating a functional signal for transmission out of said port;
converting said functional signal to an appropriate voltage signal in a removable interface circuit on a first printed circuit board (PCB) based on signals received from said wiring adapter;
transmitting said appropriate voltage signal through an interface bus;
receiving said appropriate voltage signal from said interface bus at a wiring adapter on a second PCB;
transmitting said appropriate voltage signal from said wiring adapter to a selected track in a port connection bus; and
transmitting said appropriate voltage signal from said selected track to said port.

16. The system for configuring a connection for a port in an electronic device as claimed in claim 1, wherein said second wiring adapter comprises:
a set of connections to connect said port to a second set of tracks from said interface connection circuit to a second set of tracks in said port connection bus for said interface circuit.

17. The system for configuring a connection for a port in an electronic device as claimed in claim 16, wherein said second wiring adapter is provided on said second PCB.

18. The system for configuring a connection for a port in an electronic device as claimed in claim 1, wherein said removable interface circuit provides:
a first configuration circuit for said system to provide a trunk connection for said device to a network; and
a second configuration circuit for said system to provide a subscriber connection for said device to said network.

19. The system for configuring a connection for a port in an electronic device as claimed in claim 5, wherein:
said first wiring adapter configures said port for a local area network (LAN) connection; and
said second wiring adapter configures said second port for an AD2 connection for a digital interface.

20. The system for configuring a connection for a port in an electronic device as claimed in claim 1, further comprising:
a third PCB for said system, said third PCB providing a substrate for said interface circuit connection bus and said port connection bus connecting to said port and a slot for said first wiring adapter.

* * * * *